United States Patent [19]

Torres

[11] Patent Number: 5,308,040
[45] Date of Patent: May 3, 1994

[54] FLUID FLOW REGULATING VALVE

[76] Inventor: Nestor/Ruben Torres, 331 Carlos Pellegrini Street-6th Floor, Buenos Aires, Argentina

[21] Appl. No.: 972,344

[22] Filed: Nov. 6, 1992

[30] Foreign Application Priority Data

Nov. 28, 1991 [AR] Argentina ............................... 321265

[51] Int. Cl.⁵ ...................... F16K 3/32; F16K 11/074
[52] U.S. Cl. ................................ 251/208; 251/205; 251/249.5; 137/269; 137/625.41
[58] Field of Search .................... 251/208, 205, 249.5; 137/269, 625.41

[56] References Cited

U.S. PATENT DOCUMENTS 3,424,200 1/1969 Marley et al. .................. 251/208 X
3,630,484 12/1971 Taylor ................................ 251/208
4,161,307 7/1979 Clinch et al. .................... 251/208 X

*Primary Examiner*—Arnold Rosenthal
*Attorney, Agent, or Firm*—Keck, Mahin & Cate

[57] ABSTRACT

A fluid flow regulating valve adapted to prevent the operation of the valve from violent pressure change, namely the hydraulic ram effect, in the fluid, particularly during closing and opening of the valve, the valve comprising a casing that houses a regulating plate slidably mounted within the casing. The plate has a regulating orifice having a variable fluid pass section which decreases from an end to another end of the orifice. The orifice is adapted to be aligned, through its different sections, with inlet and outlet ports provided in the casing, whereby the inlet and outlet ports communicate to each other through the orifice and the fluid flow can be regulated by those different sections of the orifice.

16 Claims, 2 Drawing Sheets

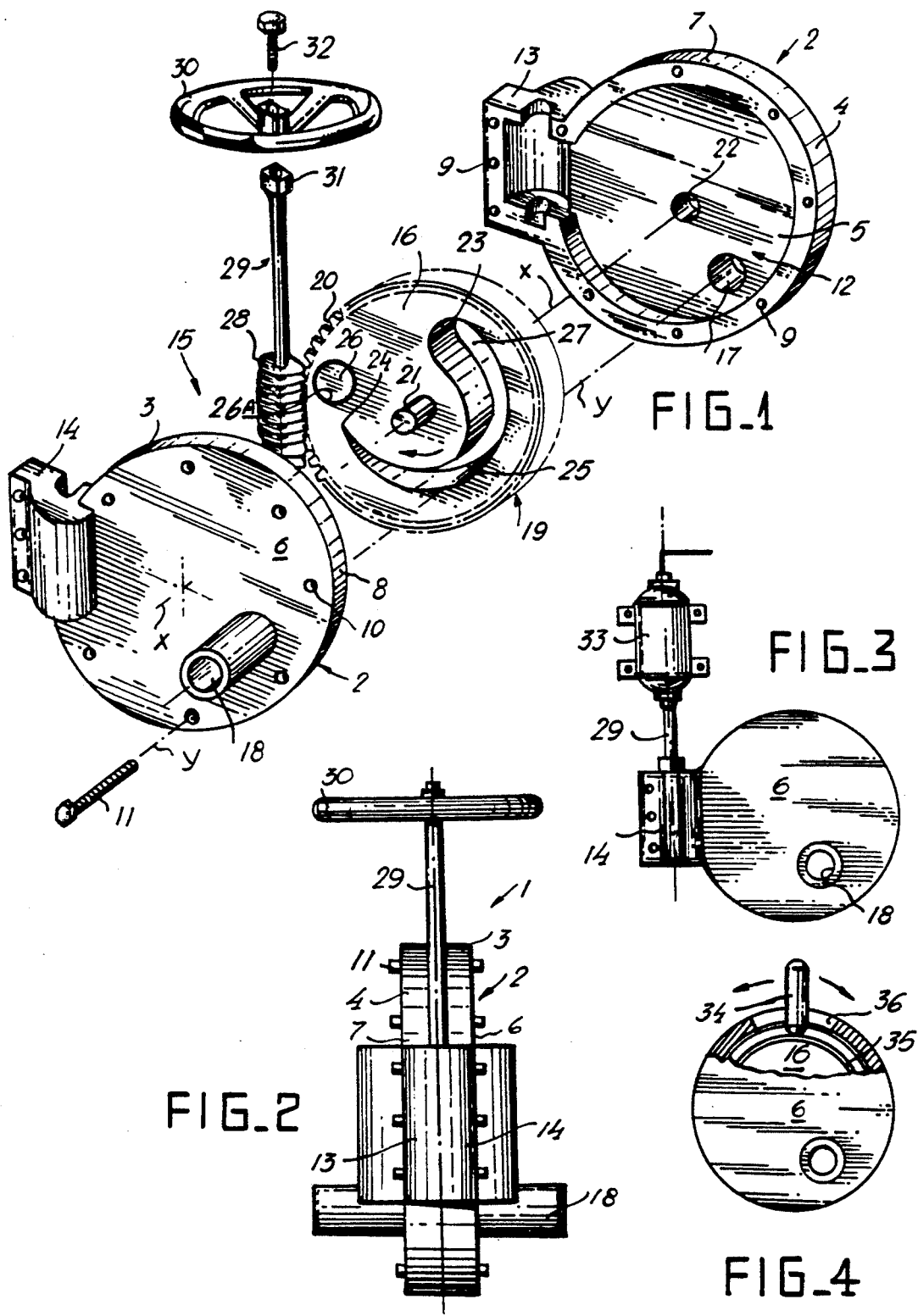

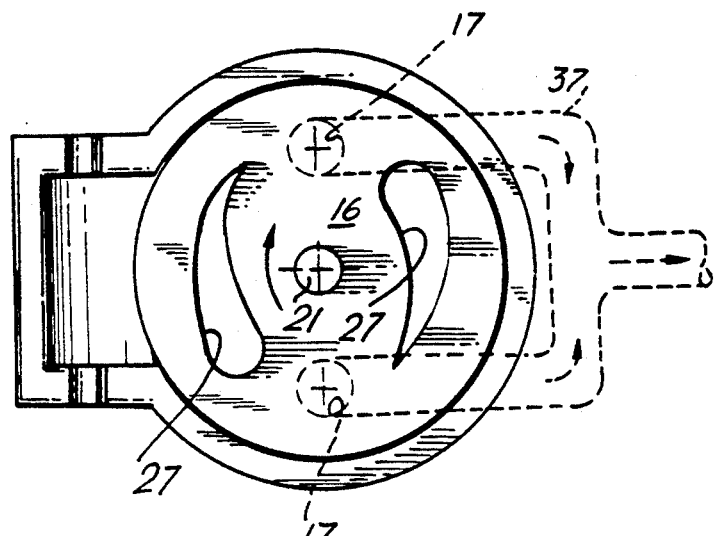
FIG_5
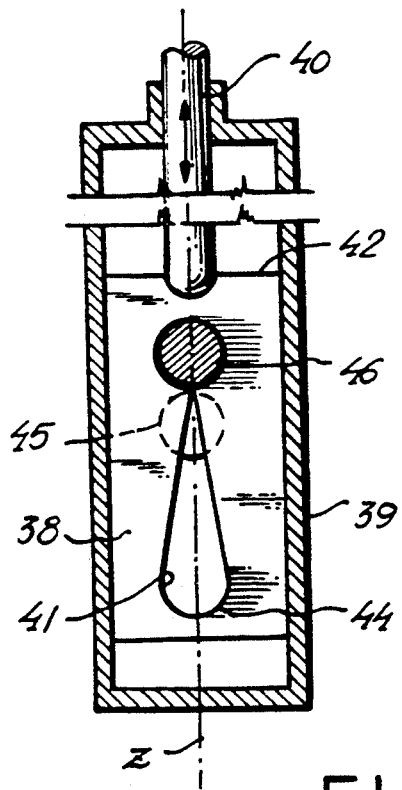
FIG_6

FLUID FLOW REGULATING VALVE

FIELD OF THE INVENTION

The current invention concerns a fluid flow regulating valve for use in the regulation of fluids, preferably liquids, circulating through pipelines, such as water pipes, oil ducts, and the like. More specifically, the present invention refers to a fluid flow regulating valve that provides a smooth and safe regulation and control of a fluid flow without generating the known "hydraulic ram" effect.

BACKGROUND OF THE INVENTION

Conventional valves are known for controlling and or regulating a fluid flow circulating through a pipe, such as flap valves, ball or spherical valves, gate valves, etc. All of them are very known in the art and, although they have worked satisfactorily in general terms, all of them have failed in obtaining a smooth regulation of the fluid flow, particularly when opening and closing the valve.

A gate valve comprises a body defining a fluid passage connected at both sides of the valve body to a pipe. A gate slides up and down within the valve body and across such a passage so as to fully open or to close the passage in respective end positions of the gate. Between the end positions, the gate partially closes the passage whereby the fluid flow is regulated. However, close to the end positions, and particularly when the valve is rapidly or quickly closed, the gate suddenly interrupt the fluid flow and, therefore, a violent pressure change is generated in the fluid, within the pipeline. This is known as hydraulic ram and has undesirable effects, sometimes with dangerous results, in the pipe, valve, fittings, couplings, etc.

The ball or spherical valve comprises a valve body housing a ball, the ball being the element that regulates the fluid flow passing through a passage defined within the body. In like manner, this valve has the same drawbacks explained above. In summary, all these valves generates a violent change of pressure within the fluid when passing from a regulation mode to a close mode and vice versa.

Other attempts to overcome the above explained problem involved the installation of several and different valve and regulating devices for obtaining a stepped control on a fluid flow.

In addition, the hydraulic ram is very dangerous in the case of fluids others than water, for instance natural gas, gasolines, chemicals, etc.

SUMMARY OF THE INVENTION

It is an object of the current invention to provide a fluid flow regulating valve that prevents the hydraulic ram in a fluid circulating through a pipeline.

It is another object of the invention to provide a fluid flow regulating and controlling valve that is simple, easy to operate, safe and reliable.

It is still another object of the invention to provide a fluid flow regulating valve adapted for regulating the flow of several and different fluids, coming from several pipes, and supplying them to a single pipe for mixing purposes.

It is yet another object of the invention to provide a fluid flow regulating valve for slowly and gradually regulating a fluid flow although the valve is speedily operated, particularly in opening and or closing the same.

These and other objects are accomplished in a fluid flow regulating valve comprising a casing which houses a flow regulating disc plate, the casing having an inner chamber, at least one inlet port and at least one outlet port for the circulation of said fluid flow through the valve, the disc plate is rotatably mounted within the inner chamber and has at least one fluid regulating orifice passing through the plate, the orifice extending circumferentially along a predetermined arc, around a rotation axis of the disc plate and defining a plurality of flow-pass sections gradually decreasing from a first end to a second end of the orifice, whereby as the disc plate rotates the valve defines a regulating mode wherein different sections of the orifice communicate the inlet and outlet ports to each other so as to regulate the fluid flow passing therethrough, and a close mode wherein at least one portion of the disc plate out of the orifice interrupts the fluid communication between the inlet and the outlet ports.

In one embodiment, at least one portion of the disc plate, out of the orifice, includes a hole passing through the plate, the hole freely receiving an insert made of a low-friction sealing material, the insert closes the fluid communication between the inlet and the outlet ports of the casing in the close mode of the valve.

In another embodiment, the at least one fluid regulating orifice comprises two diametrically opposed /rifices in the disc plate, the disc plate also including two of the portions out of the orifices, each portion including the above mentioned hole and insert.

In still another embodiment, the fluid flow regulating valve comprises a casing which houses a flow regulating plate, the casing having an inner chamber, at least one inlet port and at least one outlet port for the circulation of said fluid flow through the valve, the plate is slidably mounted within the inner chamber and along a longitudinal axis, the plate having at least one fluid regulating orifice passing through the plate, the orifice extending longitudinally along said longitudinal axis and defining a plurality of flow-pass sections gradually decreasing along said longitudinal axis, from a first end to a second end of the orifice, whereby as the disc plate slidably moves along said longitudinal axis the valve defines a regulating mode, wherein different sections of the orifice can communicate the inlet and outlet ports to each other so as to regulate the fluid flow passing therethrough, and a close mode, wherein at least one portion of the plate, out of the orifice, closes the fluid communication between the inlet and the outlet ports.

Other features and advantages of the invention will become apparent from the following description of preferred embodiments of the invention, with reference to the accompanying drawings.

BRIEF DESCRIPTION OF THE DRAWINGS

FIG. 1 is an exploded view of a fluid flow regulating valve in accordance with a first embodiment of the invention.

FIG. 2 is a rear elevation view of the embodiment of FIG. 1.

FIG. 3 is a side elevation view of a second embodiment of the invention.

FIG. 4 is a side elevation view of a third embodiment of the invention.

FIG. 5 is a side elevation view of a fourth embodiment of the invention, with a side part of the casing removed to show the interior thereof and the disc plate, and.

FIG. 6 is a partial transverse cross-section of a fifth embodiment of the invention.

DESCRIPTION OF THE PREFERRED EMBODIMENTS

Referring to FIGS. 1 and 2, a valve, generally indicated by reference number 1, in accordance with a first embodiment of the invention includes a casing 2 formed by two shells 3,4. Each shell 3,4 comprises a clilynder like body with a flat wall 5,6 defining a side wall of the casing, and an annular wall 7,8 containing holes 9,10 to connect both shells to each other, by means of bolts 11, for encircling an inner chamber 12.

A hollow protruding half-housing 13,14 extends from annular wall 7,8 of shell 2,3 to form, when shells 2,3 are coupled, a housing for valve driving means 15, reference to which will be made hereinafter. Walls 5,6 have respective inlet 17 and outlet 18 ports.

Between shells 2,3 and within chamber 12 a flow regulating disc plate 16 is slidably rotatably mounted by a shaft 21 within a bore 22 of shell 3,4, forming a sandwich-like assembly. Plate 16 has a flow regulating orifice 27 passing therethrough, that extends along a predetermined arc 25, around a rotation axis X. The orifice has a curved wedge-like configuration and the flow pass sections thereof decreases from a first end 23, wherein a maximum section is defined, to a second end 24 wherein the section is the minimum.

In any place of plate 16, in arc 25 and, preferably close to second end 24, an insert 26, made of any suitable low-friction, sealing material, is loosely or freely received within a hole 26a. Orifice 27, and hole 26a can be aligned with inlet and outlet ports 17,18 along a longitudinal axis Y. In fact, any point of arc 25 can intersect axis Y during rotation of disc 16.

Plate 16 has a toothed periphery 19 with teeth 20, which are engaged with an endless gear 28 of drive means 15. Gear 28 is connected to a stem 29 that can be operated manually by a wheel 30 fixed to an end 31 by bolt 32. When shells 3,4 are coupled to each other, gear 28 is housed within the housings 13,14, which are coupled also through holes 9,10. A gasket, not shown, may be placed between shells 3,4 to sealingly house plate 16 and drive means 15.

When stem 29 is operated by rotating wheel 30, gear 28 causes plate 16 to rotate, for example in the sense indicated by the arrow in the plate. Before starting movement, insert 26 is aligned with inlet and outlet ports 17,18 and, therefore, the valve is in a close mode with the flow interrupted. When movement starts, end 24 is aligned with ports 17,18 and, in a regulating mode, a little flow will commences to circulate through the valve. As the plate follow moving in the sense of the arrow the fluid flow increases up to a maximum defined by the section of the orifice 27 at its end 23.

It will be evident to any skilled in the art that the initial flow, at end 24 is so little that the hydraulic ram, or any other violent pressure change is prevented. To close the valve, plate 16 is rotated in a reverse sense whereby the fluid flow is gradually decreased up to the close mode and insert 26 is finally aligned with ports 17,18.

FIG. 3 shows another embodiment wherein the wheel 30 has been replaced by motor means, such as an electric motor 33.

In the embodiment shown in FIG. 4, the drive means comprises a handle 34 fixedly joined to plate 16 7hich has no teeth on its periphery but it has a smooth periphery. A sealing gasket 35 is arranged at each side of plate 16, the gasket sealing against the inner side of walls 5,6 of shells 3,4 to prevent fluid leakage via opening 36 through which handle 35 extends.

FIG. 5 shows still another embodiment wherein two diametrically located orifices 27 are provided in plate 16. Some elements which are the same shown in FIGS. 1-4, are not shown for clarity purposes. F/r example, inlet and outlet ports comprises two inlet and two outlet ports but only two inlet ports 17 are shown in phantom lines while two outlet ports 18 do not appear in this FIG. 6. Outlet ports are, however, aligned with ports 17. This embodiment is particularly adapted to regulate more than one fluid flow and supply them to pipes 37 for mixing purposes, as it is also illustrated in phantom lines.

Finally, another embodiment is shown in FIG. 6 wherein a rectangular plate 38 is slidably located within a casing 39 which can be, like in the first embodiment, a two-shell casing. Only one shell is illustrated in FIG. 7, while a matching shell has been removed to show the interior of the valve. The drive means comprises a stem 40 fixed to an upper edge 42 of the plate and can be moved manually as it is shown by the arrows. Like in conventional gate valves, the stem can be rotatably freely connected to plate 38 and stem 40 can be rotated by means of a wheel (not shown) to cause plate 38 to slide up and down within the casing.

Plate 38 has a passing through orifice 41 longitudinally extending along a longitudinal axis Z, from a first end 44, having a maximum flow section and a second end 45 of a minimum flow section. The casing has inlet and outlet ports of which only one 46 is shown partially in phantom lines because is behind plate 38. In the position of plate 38, shown in FIG. 7, orifice 41 is in a starting stage of the regulating mode of the valve with the minimum section end of orifice 41 aligned with port 46. In the close mode, a lower edge 47 of plate 38 is in contact with the bottom 48 of casing 39 and port 46 is closed by a portion of plate 38 out of orifice 41. Like in the other embodiments, an insert can be arranged close to end 45, for example an insert 26 as shown in FIG. 1, to improve the closing of the valve.

While the above description contains many specificities, these should not be construed as limitations on the scope of the invention, but rather as an exemplification of preferred embodiments thereof. Accordingly, the scope of the invention should be determined not by the embodiments illustrated, but by the appended claims and their legal equivalents.

I claim:

1. A fluid flow regulating valve comprising a casing which houses a flow regulating disc plate, the casing having an inner chamber, at least one inlet port and at least one outlet port for circulation of the fluid flow through the valve, the disc plate is rotatably mounted within the inner chamber and has at least one fluid regulating orifice passing through the disc plate and defining a plurality of flow-pass sections gradually decreasing from a first end to a second end of the orifice, whereby as the disc plate rotates the valve defines a regulating mode wherein different sections of the orifice can communicate the inlet and outlet ports to each other so as to regulate the fluid flow passing therethrough, and a close mode wherein at least one portion of the disc plate out of the orifice interrupts the fluid communication between the inlet and the outlet ports, wherein the at least one portion of the disc plate out of the orifice includes a hole passing through the plate, the hole freely receiving an insert made of a low-friction sealing material, and the insert closes the fluid communication between the inlet and the outlet ports of the casing in the close mode of the valve.

2. A fluid flow regulating valve according to claim 1, wherein the orifice extends circumferentially along a predetermined arc and around a rotation axis of the disc plate.

3. A fluid flow regulating valve according to claim 1, wherein drive means are provided to controllably rotate the disc plate.

4. A fluid flow regulating valve according to claim 3, wherein the disc plate has a toothed periphery and the drive means comprises gear means in gearing relationship with the toothed periphery of the disc plate, the gear means being connected to actuating means located externally to the inner chamber of the casing.

5. A fluid flow regulating valve according to claim 4, wherein the actuating means comprises an electric motor.

6. A fluid flow regulating valve according to claim 1, wherein the casing comprises a two-shell casing, the shells being sealingly coupled to each other, forming said inner chamber and arranged at respective opposite sides of the disc plate.

7. A fluid flow regulating valve according to claim 1, wherein the inlet and outlet ports are respectively located at opposite side walls of the casing.

8. A fluid flow regulating valve according to claim 1, wherein the at least one fluid regulating orifice comprises two diametrically opposed orifices in the disc plate.

9. A fluid flow regulating valve according to claim 1, wherein the at least one fluid regulating orifice comprises two diametrically opposed orifices in the disc plate, the disc plate also including two of the portions out of the orifices, each portion including the hole and the insert.

10. A fluid flow regulating valve according to claim 2, wherein the orifice has a curved wedge-like configuration.

11. A fluid flow regulating valve according to claim 3, wherein the drive means comprises a handle fixed to the disc plate and extending out of said casing.

12. A fluid flow regulating valve comprising a casing which houses a flow regulating plate, the casing having an inner chamber, at least one inlet port and at least one outlet port for the circulation of the fluid flow through the valve, the plate being slidably movably mounted within the inner chamber and having at least one fluid regulating orifice passing through the plate and defining a plurality of flow-pass sections gradually decreasing from a first end to a second end of the orifice, whereby as the plate slidably moves the valve defines a regulating mode wherein different sections of the orifice can communicate the inlet and outlet ports to each other so as to regulate the fluid flow passing therethrough, and a close mode wherein at least one portion of the plate out of the orifice interrupts the fluid communication between the inlet and the outlet ports, the at least one portion of the plate out of the orifice includes a hole passing through the plate, the hole freely receiving an insert made of a low-friction sealing material, the insert closes the fluid communication between the inlet and the outlet ports of the casing in the close mode of the valve.

13. A fluid flow regulating valve according to claim 12, wherein the plate is slidably mounted within the inner chamber and along a longitudinal axis, the orifice extending longitudinally along said longitudinal axis and defining the plurality of flow-pass sections gradually decreasing along said longitudinal axis, whereby as the plate slidably moves along said longitudinal axis the valve defines the regulating mode.

14. A fluid flow regulating valve according to claim 12, wherein the plate is a disc plate rotatably mounted within the inner chamber, whereby as the disc plate rotates the valve defines the regulating mode.

15. A fluid flow regulating valve according to claim 13, wherein drive means are provided to controllably move the plate along the longitudinal axis.

16. A fluid flow regulating valve according to claim 15, wherein the at least one portion of the plate out of the orifice includes a hole passing through the plate, the hole freely receiving an insert made of a low-friction sealing material, the insert closes the fluid communication between the inlet and the outlet ports of the casing in the close mode of the valve.

* * * * *

UNITED STATES PATENT AND TRADEMARK OFFICE
CERTIFICATE OF CORRECTION

PATENT NO. : 5,308,040
DATED : May 3, 1994
INVENTOR(S) : Nestor/Ruben Torres

It is certified that error appears in the above-indentified patent and that said Letters Patent is hereby corrected as shown below:

On title page, item [76] change "Nestor/Ruben Torres" to --Nestor R. Torres--.

Signed and Sealed this

Eighth Day of November, 1994

Attest:

BRUCE LEHMAN

Attesting Officer

Commissioner of Patents and Trademarks